2,700,261

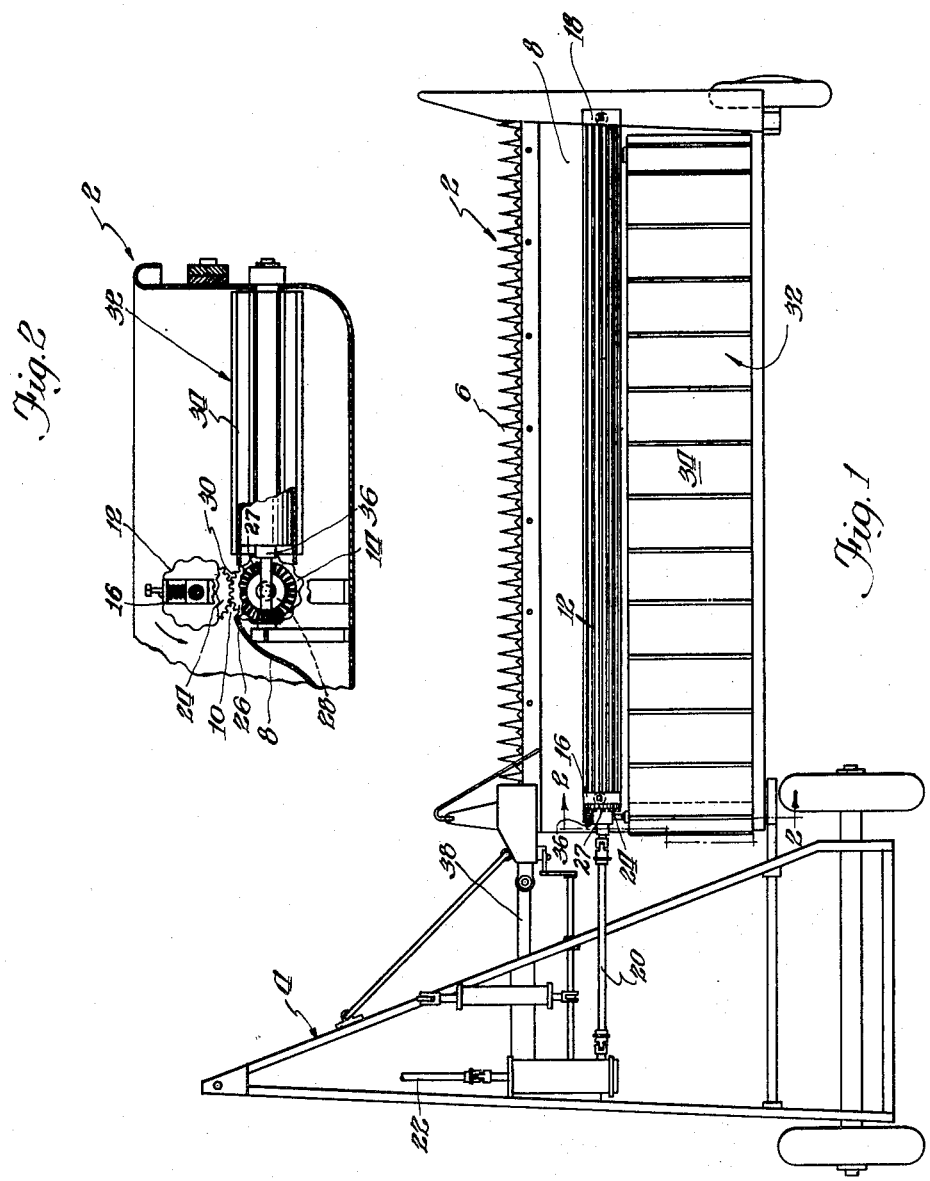

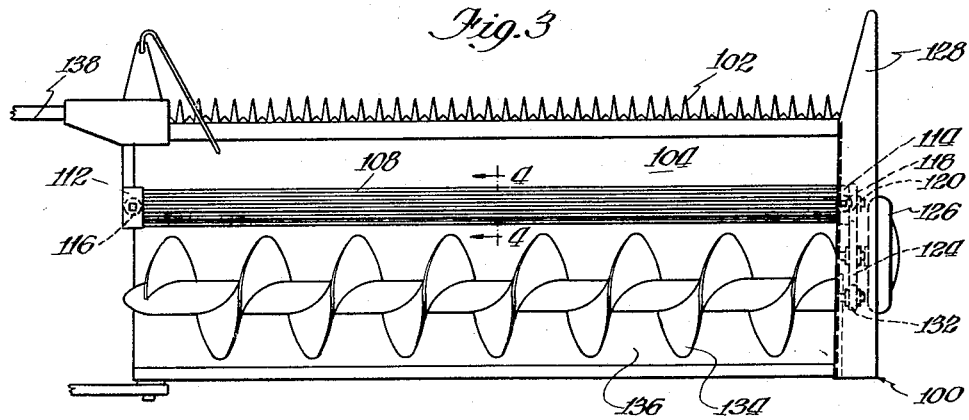
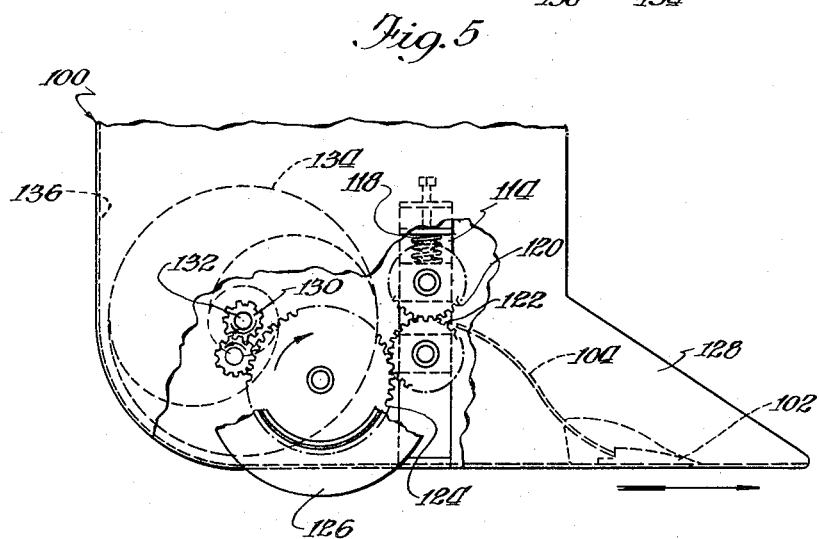
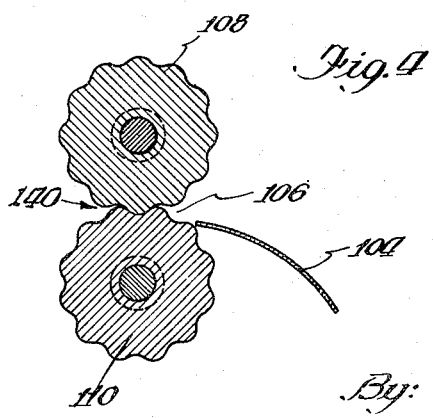

WINDROWER HAVING CRUSHING MEANS

Arthur A. Scarlett and Stephen M. Young, Hamilton, Ontario, Canada, assignors to International Harvester Company, a corporation of New Jersey Application August 18, 1951, Serial No. 242,452

2 Claims. (Cl. 56—1)

This invention relates to harvesting apparatus for operating on alfalfa hay and the like.

One object of the invention is to provide a machine wherein the parts are arranged to obtain a simple, compact, efficient and relatively inexpensive unit.

A general object is to arrange the several components of the unit so that they each perform a plurality of cooperative functions.

A more specific object is to locate a crushing device immediately behind and to feed directly from a mower and discharge onto a windrow conveyor whereby the mower is kept clear, the crop is presented in good feeding position to the crushing device, and the crusher, in addition to processing the crop preparatory to curing also compacts it to reduce its bulk before depositing it upon the conveyor. This debulking by the crusher admits a relatively small conveyor thereby reducing cost and weight and excessive spilling over the ground.

A further object is to arrange the conveyor with respect to the crushing device so as to utilize the crop itself to sweep off the crushing device.

In this connection, the invention contemplates the provision of a crushing device comprising a pair of opposed rollers extending axially along the rear of a sickle, the feeding side of the rollers facing forwardly toward the back of the sickle and the discharge side facing rearwardly whereat the conveyor is located for moving the crushed crops laterally of the unit into windrows. The crop on the conveyor is moved axially of the rollers along the discharge side thereof whereby sweeping any plant accretions thereon to prevent fouling.

In one embodiment an auger is employed to convey and arranged with its flight close to the discharge sides of the rolls to aid in brushing off the crop.

These and other objects of the invention will become more apparent from the specification and the drawings, wherein:

Figure 1 is a top plan view of one embodiment of the invention.

Figure 2 is an enlarged sectional view taken substantially on the line 2—2 of Figure 1 with parts broken away to clarify the illustration.

Figure 3 is a fragmentary top plan view of another embodiment of the invention.

Figure 4 is an enlarged sectional view taken substantially on the line 4—4 of Figure 3, and Figure 5 is an enlarged end view with the outboard paneling broken away.

Describing the invention in detail and referring first to the embodiments shown in Figures 1 and 2, the harvesting or haying machine generally indicated 2 is supported at its inboard end from a supporting wheeled framework 4 of generally conventional design such as will be readily understood by those skilled in the art.

The harvester unit 2 comprises an ambulant or mobile support structure including a transverse cutter bar or sickle cutter 6 at its forward edge and behind the cutter bar with an attached platform 8 substantially coextensive with the cutter bar and including a deck extending curvingly diagonally upwardly from the cutter bar and terminating at its rear edge at an intake 10 formed between a pair of vertically spaced opposed upper and lower rotatable crushing rolls 12 and 14 which form a combined crushing and compacting device. The rolls 12 and 14 are preferably axially fluted or corrugated and are axially coextensive with the cutter bar longitudinally of the unit 2. The crushing rolls 12 and 14 are rotatably supported at their inboard and outboard extremities on the platform from supporting brackets 16 and 18 respectively and are yieldably biased toward each other to provide a grasping attitude therebetween. The upper roll 12 may be operatively connected through a shaft 20 to a power take-off shaft 22 carried by the support framework 4 to rotate in a counterclockwise direction as shown by the arrow in Figure 2. The shaft 20 may be keyed to a gear 24 which meshes with a gear 26 keyed to a shaft 28 journaling the lower crushing roll 14 from the brackets 16 and 18. The lower roll 14 is thus caused to rotate in a clockwise direction. The crushing rolls 12 and 14 form a discharge zone 30 at the rear thereof which opens onto a conveyor 32, said conveyor 32 being herein shown as comprising a draper including an apron 34 extending from the inboard to the outboard extremities of the rolls and rotatably supported at opposite ends from the ambulant support or platform, as best seen in Figure 2 and rotatable with its top flight advancing toward the stubbleward side or inboard extremity of the unit. The conveyor may be powered from the power take-off through a suitable shaft and pinion gearing 36 meshing with ring gear 27 on the outer side of gear 26. The sickle may be powered in usual manner through a pitman connection 38 from the power take-off drive.

Referring now to the embodiments shown in Figures 3 through 5, the harvesting unit generally indicated 100 comprises an ambulant structure including a sickle or cutter bar 102 at its forward extremity followed by an attached laterally coextensive deck or platform 104 which has a portion extending diagonally upwardly rearwardly and terminating at an inlet or intake nip 106 defined between a pair of opposed upper and lower crushing rolls 108 and 110 which form a combined crushing and compacting device and which extend axially substantially coextensive with the cutter bar and the deck 104. The inboard and outboard extremities of the axially fluted corrugated crushing rolls are suitably supported from brackets 112 and 114 on the ambulant or support structure as best seen in Figures 3 and 5, and the top roll is yieldably biased toward the bottom roll by spring assemblies 116 and 118 carried by the brackets 112 and 114, respectively. The outboard extremities of the rolls are keyed to meshing gears 120 and 122, respectively and the gear 122 of the lower roll meshes with a gear 124 driven by a ground engaging gauge wheel 126 which is suitably journaled to the panels of an outboard divider 128 which together with the platform constitutes the basic ambulant structure. The upper edge of the gear 124 also meshes through an idler gear with a gear 130 constrained for rotation with a shaft 132 journaled on the divider at its outboard end and supporting an auger conveyor 134 which extends axially generally parallel to the crushing rolls at their discharge side or bight within a trough 136. The auger 134 is of an open end type and has its open end on the stubbleward or inboard side of the unit that is opposite to a stand of crop material. It will be seen that the cutter bar in this embodiment is powered from a power take-off shaft by a pitman 138 and that the crushing rolls and auger conveyor are ground wheel driven. Suitable gearing may be readily provided to drive the auger and rollers from the power take-off. The auger is positioned rearwardly of the crushing rolls and the auger flights are formed with sinistrorsal convolutions, the auger rotating in a clockwise direction Figure 5 in order to obtain a downwardly sweeping attitude at the edge of the auger facing toward the rear discharge side or zone 140 of the crushing rolls. It will be noted that the auger will move the crop laterally and also per se as well as with the crop performs a sweeping action with respect to the crushing rolls. Similarly the top run of the conveyor of Figures 1 and 2 is close enough to serve as a scraper with respect to rolls 12 and 14. Thus both designs serve as scraper and conveyors.

In each of these designs the location of the crop on the conveyors immediately to the rear of the crushing rolls utilizes the crop to catch any lengths of hay which may, upon discharging from the rolls, tend to move with or wind on the roll. Thus the crop facilitates stripping of the rolls.

In each arrangement the crushing rolls are positioned close enough back of the cutter to accept the crop immediately after it is cut in substantially its standing position before it is prostrated and each succeeding cutting thus lays on the one thereahead so that the natural fall of the hay is utilized in part to convey it to the crushers.

What is claimed is:

1. In a crop harvesting mechanism, an ambulant structure, a transverse cutter bar on said structure, a combined crushing and compacting device on said structure in the form of a pair of opposed rolls disposed in receiving relationship to said cutter bar, and a conveyor carried upon said structure in receiving relationship to said device and comprising an auger having a helical flight, said auger positioned with the outer edge of said flight disposed immediately adjacent to the peripheries of both of said crushing rolls at their back sides for scraping said rolls clean of crop material tending to adhere thereto.

2. In combination in a haying machine; a movable frame; a sickle mower of substantial length supported on said frame and facing forwardly thereof to cut crop material; a pair of co-acting crusher rolls carried by the frame, and extending generally parallel to the sickle mower and forming a rear discharge bight and an intake nip therebetween facing said sickle mower and operatively associated therewith to receive cut crop material therefrom; and a windrower carried by the frame in operative association with said crusher rolls to receive crushed material from said discharge bight and to deposit the same upon the ground in a windrow trailing the machine at the side opposite from the standing crop material as the machine moves along the edge of a stand of crop material, said windrower comprising a trough embodied in the frame and disposed behind and extending lengthwise generally parallel to said rolls for substantially the full length thereof, an auger rotatably supported from said frame within said trough generally parallel to said rolls and of a length generally coextensive with said rolls, said auger having a helical flight positioned with its outer edge in close proximity to both of said rolls, and means for rotating said auger with said edge wiping said rolls of crop material tending to wind thereon, said auger supported only at one end from said frame adjacent to said stand of crop material.

References Cited in the file of this patent

UNITED STATES PATENTS

| | | |
|---|---|---|
| 1,917,556 | Soss | July 11, 1933 |
| 1,932,714 | Thoen | Oct. 31, 1933 |
| 1,958,910 | Christiansen | May 15, 1934 |
| 2,346,103 | Everett | Apr. 4, 1944 |
| 2,507,635 | James | May 16, 1950 |
| 2,521,999 | Scott | Sept. 12, 1950 |
| 2,571,652 | Bass | Oct. 16, 1951 |
| 2,592,269 | Getz | Apr. 8, 1952 |
| 2,664,684 | Russell | Jan. 5, 1954 |